(12) United States Patent
Lee et al.

(10) Patent No.: US 12,333,927 B2
(45) Date of Patent: Jun. 17, 2025

(54) APPARATUS AND METHOD OF PROVIDING HAPTIC STIMULATION

(71) Applicants: Hyundai Motor Company, Seoul (KR); KIA CORPORATION, Seoul (KR)

(72) Inventors: Jang Hyeon Lee, Hwaseong-Si (KR); Il Seon Yoo, Suwon-Si (KR); Dae Sung Kwon, Seoul (KR); Dong Gu Kim, Suwon-Si (KR); Hyun Soo Kim, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 245 days.

(21) Appl. No.: 18/137,551

(22) Filed: Apr. 21, 2023

(65) Prior Publication Data

US 2024/0161588 A1 May 16, 2024

(30) Foreign Application Priority Data

Nov. 14, 2022 (KR) .......................... 10-2022-0151779

(51) Int. Cl.
*G08B 6/00* (2006.01)
*B06B 1/06* (2006.01)
(Continued)

(52) U.S. Cl.
CPC ................ *G08B 6/00* (2013.01); *B06B 1/06* (2013.01); *G06F 3/016* (2013.01); *G08B 21/22* (2013.01)

(58) Field of Classification Search
CPC ........... G08B 6/00; G08B 21/22; G06F 3/016; B06B 1/06
See application file for complete search history.

(56) References Cited

U.S. PATENT DOCUMENTS

2011/0134251 A1 6/2011 Kim et al.
2018/0335626 A1 11/2018 Ji
(Continued)

FOREIGN PATENT DOCUMENTS

CN 102640081 B 11/2015
JP 2003-044213 A 2/2003
(Continued)

OTHER PUBLICATIONS

Large, David R. et al., "Evaluating secondary input devices to support an automotive touchscreen HMI: A cross-cultural simulator study conducted in the UK and China," Applied Ergonomics, 13 pages, 2019.
(Continued)

*Primary Examiner* — Daniel Pihulic
(74) *Attorney, Agent, or Firm* — Banner & Witcoff, Ltd.

(57) ABSTRACT

An apparatus for providing haptic stimulation includes an ultrasonic actuator configured to provide haptic stimulation to a part of a body located at a target location by generating an ultrasonic signal, and forming sound pressure at the target location via the generated ultrasonic signal; an object sensor provided around the ultrasonic actuator and configured to detect an object within a region between the ultrasonic actuator and the target location; and a control module configured to stop operation of the ultrasonic actuator based on detecting the object within the region is sensed.

18 Claims, 6 Drawing Sheets

(51) Int. Cl.
   *G06F 3/01*   (2006.01)
   *G08B 21/22*  (2006.01)

(56) References Cited

U.S. PATENT DOCUMENTS

| | | |
|---|---|---|
| 2020/0307378 A1 | 10/2020 | Sase et al. |
| 2021/0031687 A1 | 2/2021 | Kim |
| 2021/0162457 A1 | 6/2021 | Ebefors |
| 2024/0161588 A1* | 5/2024 | Lee .......................... G08B 6/00 |

FOREIGN PATENT DOCUMENTS

| | | |
|---|---|---|
| JP | 2020-160877 A | 10/2020 |
| JP | 2022-003535 A | 1/2022 |
| KR | 10-2011-0064106 A | 6/2011 |
| KR | 10-2018-0126707 A | 11/2018 |
| KR | 10-2021-0015323 A | 2/2021 |

OTHER PUBLICATIONS

Singhal, Tanay et al., "Evaluating Haptics: An Accessible and Contactless Elevator Concept with Tactile Mid-Air Controls," 2021 CHI Conference on Human Factors in Computing Systems, 4 pages, 2021.

* cited by examiner

APPARATUS AND METHOD OF PROVIDING HAPTIC STIMULATION

CROSS-REFERENCE TO RELATED APPLICATIONS

The application claims benefit of priority to Korean Patent Application No. 10-2022-0151779, filed on Nov. 14, 2022, in the Korean Intellectual Property Office, the disclosure of which is incorporated herein by reference in its entirety.

BACKGROUND

1. Field

Example embodiments of the present disclosure relate to an apparatus and a method of providing haptic stimulation.

2. Description of Related Art

Haptics is a technique of inducing the perception of touch in a human body via a mechanical device. One such example mechanical device may produce a sound pressure to cause haptic feedback.

However, an excessively high sound pressure may harm parts of a body, such as causing loss of balance and dizziness. Thus, it may be necessary to address this issue.

SUMMARY

An example embodiment of the present disclosure is to provide an apparatus and a method of providing haptic stimulation which may protect parts of a body from high sound pressure caused by ultrasonic signals, and may provide haptic stimulation to overall passengers, even from a long distance, within a vehicle.

According to one or more example embodiments, an apparatus may include: an ultrasonic actuator configured to provide haptic stimulation to a part of a body located at a target location by: generating an ultrasonic signal; and forming sound pressure at the target location via the generated ultrasonic signal; an object sensor provided around the ultrasonic actuator and configured to detect an object within a region between the ultrasonic actuator and the target location; and a control module configured to stop operation of the ultrasonic actuator based on detecting the object within the region.

The ultrasonic actuator may include a plurality of ultrasonic transducers. Within the region between the ultrasonic actuator and the target location, a magnitude of sound pressure overlapping by each of the plurality of ultrasonic transducers may be greater than or equal to a predetermined magnitude.

The object sensor may include a plurality of object sensors provided around the ultrasonic actuator.

The object sensor may include at least one of: a laser sensor, an infrared sensor, or an ultrasonic sensor.

The plurality of ultrasonic transducers may be disposed such that a distance between any two adjacent ultrasonic transducers of the plurality of ultrasonic transducers is equal to a diameter of an ultrasonic transducer of the plurality of ultrasonic transducers.

The ultrasonic actuator and the object sensor may be included in a haptic stimulation providing unit. At least two or more haptic stimulation providing units may be disposed in a matrix form on a planar body of a planar haptic stimulation providing module.

The haptic stimulation providing unit or the planar haptic stimulation providing module may be provided on at least one of: an upper part of an interior of a vehicle, a center fascia, an A-pillar, or a windshield.

The predetermined magnitude may be 140 dB.

The object may be the part of the body.

According to one or more example embodiments, a method may include: providing, via an ultrasonic actuator, a haptic stimulation to a part of a body located at a target location by: generating an ultrasonic signal; and forming sound pressure at the target location via the generated ultrasonic signal; detecting, via an object sensor provided around the ultrasonic actuator, an object within a region between the ultrasonic actuator and the target location; and stopping operation of the ultrasonic actuator based on detecting the object within the region.

The ultrasonic actuator may include a plurality of ultrasonic transducers. Within the region between the ultrasonic actuator and the target location, a magnitude of sound pressure overlapping by each of the plurality of ultrasonic transducers may be greater than or equal to a predetermined magnitude.

The object sensor may include a plurality of object sensors provided around the ultrasonic actuator.

The object sensor may include at least one of: a laser sensor, an infrared sensor, or an ultrasonic sensor.

The plurality of ultrasonic transducers may be disposed such that a distance between any two adjacent ultrasonic transducers of the plurality of ultrasonic transducers is equal to a diameter of an ultrasonic transducer of the plurality of ultrasonic transducers.

The ultrasonic actuator and the object sensor may be included in a haptic stimulation providing unit. At least two or more haptic stimulation providing units may be disposed in a matrix form on a planar body of a planar haptic stimulation providing module.

The haptic stimulation providing unit or the planar haptic stimulation providing module may be provided on at least one of an upper part of: an interior of a vehicle, a center fascia, an A-pillar, or a windshield.

The predetermined magnitude may be 140 dB.

The object may include the part of the body.

According to an example embodiment of the present disclosure, an apparatus for providing haptic stimulation includes an ultrasonic actuator for providing haptic stimulation to a part of a body located at a target location by generating an ultrasonic signal and forming sound pressure at a target location by the generated ultrasonic signal; an object sensor provided around the ultrasonic actuator and sensing an object within a dangerous region between the ultrasonic actuator and the target location; and a control module for stopping operation of the ultrasonic actuator when an object within the dangerous region is sensed.

According to an example embodiment of the present disclosure, a method of providing haptic stimulation includes a first operation of providing a haptic stimulation to a part of a body located at a target location by generating an ultrasonic signal by an ultrasonic actuator and forming sound pressure at a target location by the generated ultrasonic signal; a second operation of sensing an object within a dangerous region between the ultrasonic actuator and the target location by an object sensor provided around the ultrasonic actuator; and a third operation of stopping operation of the ultrasonic actuator when an object within the dangerous region is sensed in a control module.

According to an example embodiment of the present disclosure, a computer-readable storage medium in which a program for executing the method on a computer is written may be provided.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
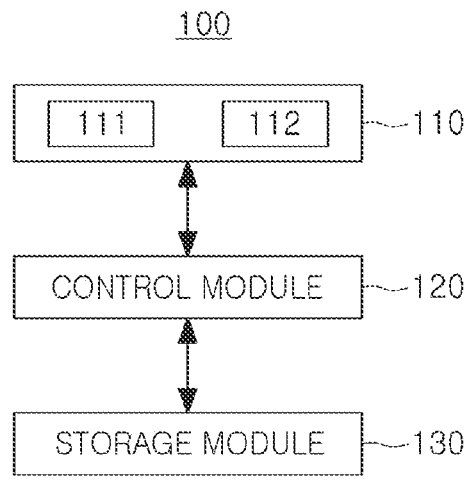
FIG. 1 is a block diagram illustrating an apparatus for providing haptic stimulation.

Hereinafter, example embodiments of the present disclosure will be described as below with reference to the attached drawings.

Hereinafter, various example embodiments will be described in greater detail with reference to the accompanying drawings so as for a person having ordinary skill in the art to easily implement the example embodiments. However, the example embodiment may be implemented in various ways, and are not limited to the example embodiments described herein. Also, illustration of parts having nothing to do with the explanation of the present disclosure is omitted from the drawings to clearly explain the present disclosure. Throughout the specification, similar reference numerals are used for similar elements.

Haptics technology may provide haptic (e.g., touch) stimulation to a part of a body located at a target location by forming sound pressure at a target location by an ultrasonic signal. Haptics using such an ultrasonic transducer may be used in short distances (e.g., less than 20 cm), but by increasing an output of the ultrasonic transducer, a distance at which haptic stimulation is possible may be increased. Because a high sound pressure may be harmful to parts of a body that are exposed to it, such as causing loss of balance and dizziness, one or more embodiments of the present disclosure may be implemented to alleviate, eliminate, or avoid such detrimental effects.

Figure 2:
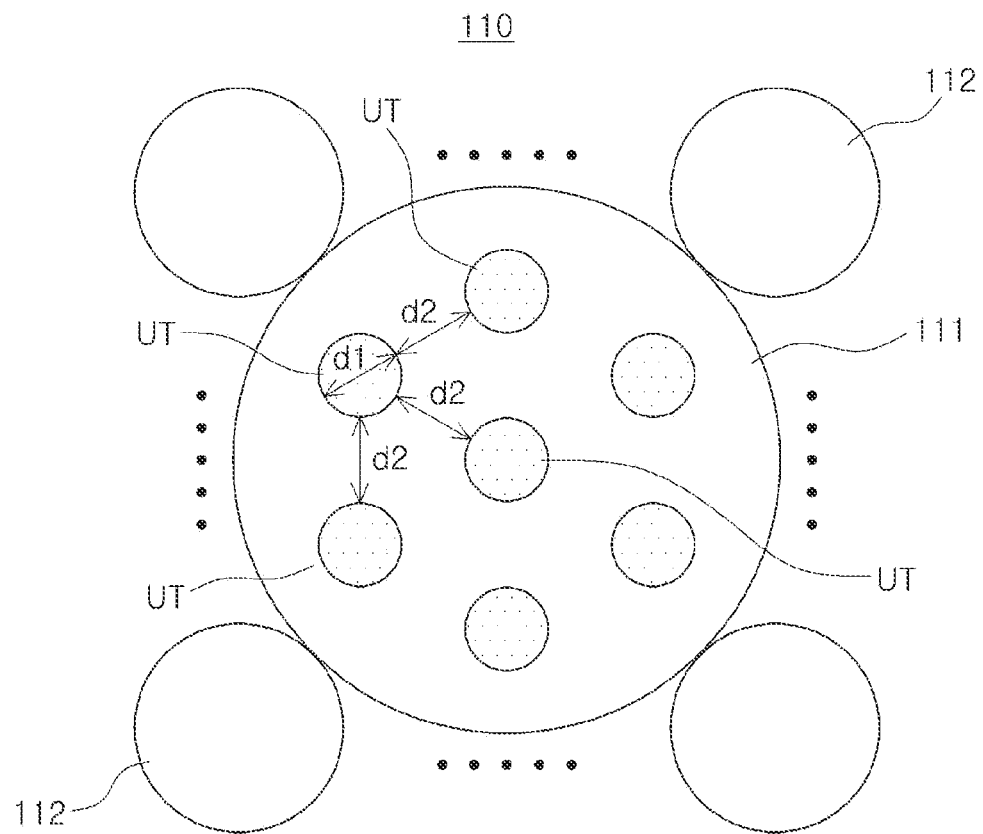
FIG. 2 is a diagram illustrating a haptic stimulation providing unit including an ultrasonic actuator and an object sensor.
Figure 3:
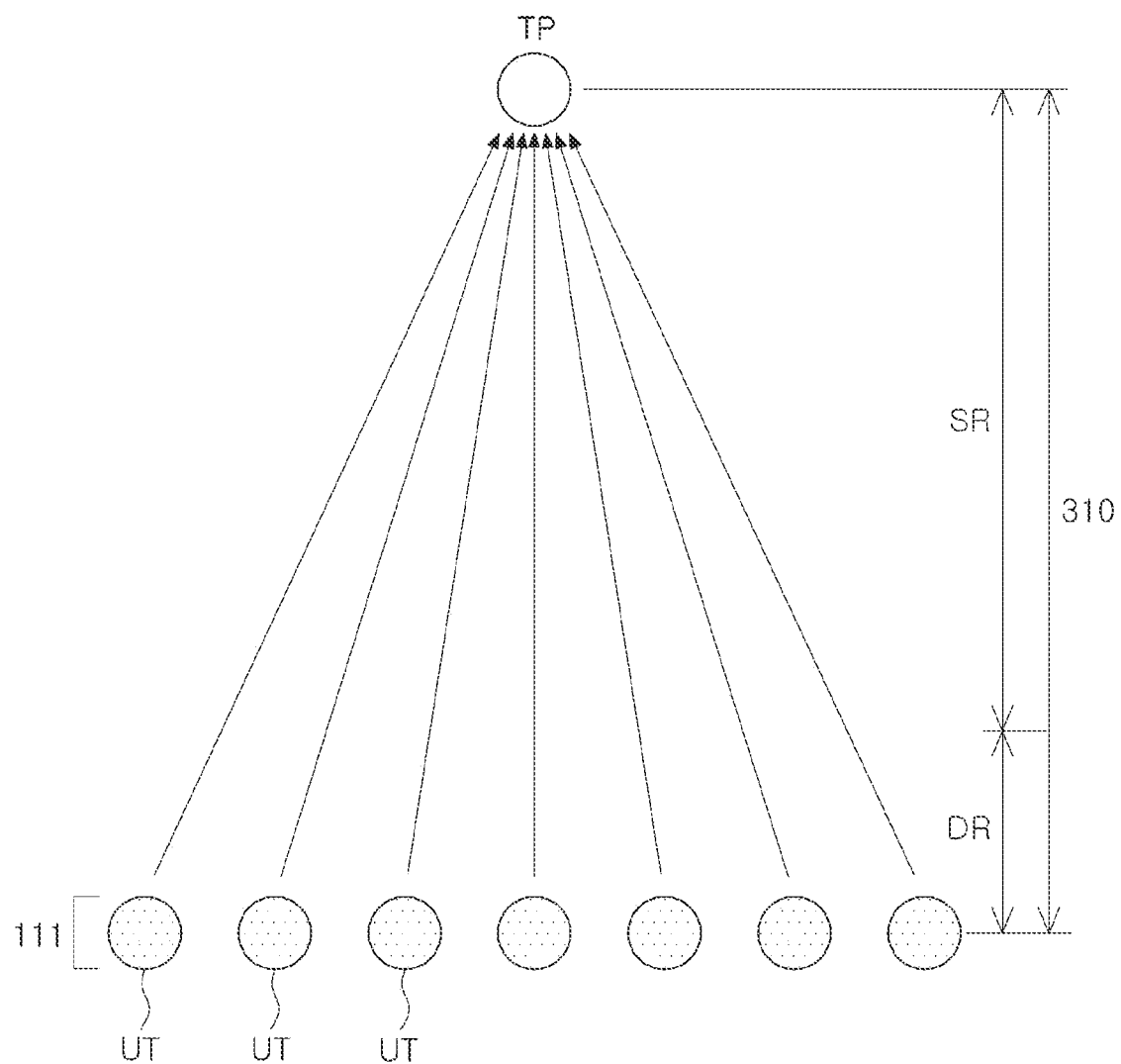
FIG. 3 is a diagram illustrating an ultrasound signal focused on a target location.
Figure 4A:
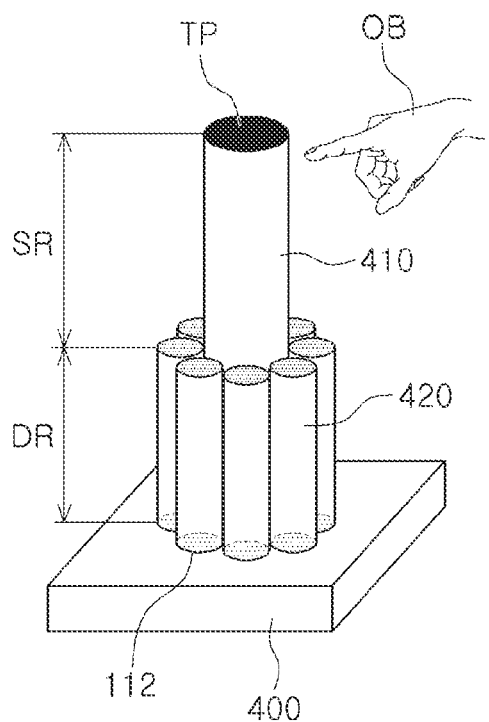
FIGS. 4A and 4B are diagrams illustrating operations of an apparatus for providing haptic stimulation.
Figure 4B:
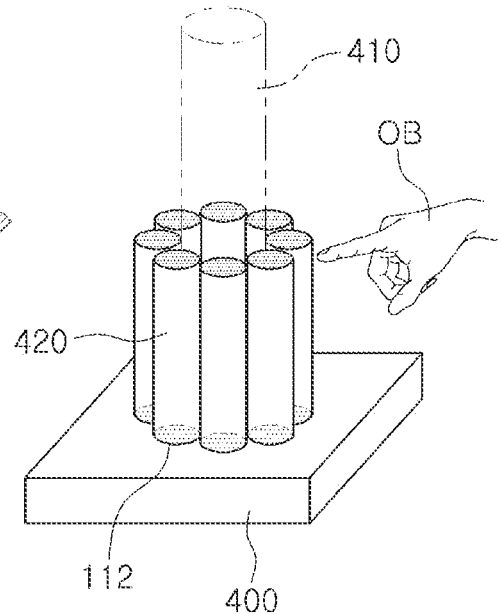

FIG. 1 is a block diagram illustrating an apparatus for providing haptic stimulation. FIG. 2 is a diagram illustrating a haptic stimulation providing unit including an ultrasonic actuator and an object sensor. FIG. 3 is a diagram illustrating an ultrasound signal focused on a target location. FIGS. 4A and 4B are diagrams illustrating operations of an apparatus for providing haptic stimulation.

First, as illustrated in FIG. 1, the apparatus for providing haptic stimulation 100 may include a haptic stimulation providing unit 110, a control module 120, and a storage module 130, and the haptic stimulation providing unit 110 may include an ultrasonic actuator 111 and an object sensor 112.

The ultrasonic actuator 111 of the haptic stimulation providing unit 110 may generate an ultrasonic signal and may form sound pressure at a target location by the generated ultrasonic signal, thereby providing a haptic stimulation to a part of the body located at the target location. The part of the body may feel stimulation by the sound pressure formed at the target location described above.

Generally, the magnitude of sound pressure at which stimulation is felt may be different for each person, such that the magnitude may not be uniformly defined, but it is assumed, in these examples, that about 50 dB or more may be the minimum sound pressure at which stimulation may be felt.

Also, in the case in which the sound pressure exposed to the body is less than about 140 dB, the sound pressure may not be harmful to the body, but in the case in which the sound pressure is more than about 140 dB, mild heating sensation may be felt. In the case in which the sound pressure is more than about 160 dB, physical pain such as dizziness or loss of balance may be accompanied. Accordingly, it is assumed that a sound pressure of approximately 140 dB or higher may cause harm to the body.

Accordingly, in the example embodiments, it is assumed that the sound pressure formed at the target location may be approximately 50 dB or more and 120 dB or less, and the region in which the magnitude of sound pressure generated by the ultrasonic actuator 111 is a predetermined magnitude of, for example, 140 dB or more, in the region from the ultrasonic actuator 111 to the target location may be defined as a dangerous region DR. Also, a region in which the sound pressure generated by the ultrasonic actuator 111 is less than 140 dB in the region from the ultrasonic actuator 111 to the target location may be defined as a safety region SR.

Although, in the example embodiments, the magnitude of sound pressure for defining a dangerous region and a safety region may be limited to a specific numerical value, but example embodiments thereof are not limited thereto, and the magnitude may be modified in example embodiments.

Specifically, as illustrated in FIG. 2, the ultrasonic actuator 111 may include a plurality of ultrasonic transducers UT.

The plurality of ultrasonic transducers UT described above may be disposed such that a distance d2 between ultrasonic transducers adjacent to each other and a diameter d1 of the ultrasonic transducers may be the same.

The reason for disposing the distance d2 between ultrasonic transducers adjacent to each other and the diameter d1 of the ultrasonic transducer to be the same may be based on simulation results (and/or empirical data) as described below.

That is, if the applied voltage is 20 Vpp, the frequency of the ultrasonic transducer in the middle may be 40 kHz, the frequency of the two ultrasonic transducers on both sides is 80 KHz, respectively, and the diameter of each of three ultrasonic transducers is 4 mm, (i) if the distance between the ultrasonic transducers is 2 mm, the sound pressure at the target location 80 mm away from the ultrasonic transducer may be 6.23 Pa, (ii) if the distance between the ultrasonic transducers is 4 mm, according to the simulation results, the sound pressure at the target location 80 mm away from the ultrasonic transducer may be 6.39 Pa, and (iii) if the distance between the ultrasonic transducers is 8 mm, the sound pressure at the target location 80 mm away from the ultrasonic transducer may be 3.62 Pa.

That is, according to the simulation results, it is indicated that the maximum sound pressure may be formed at the target location if the plurality of ultrasonic transducers are disposed such that the distance d2 between ultrasonic transducers adjacent to each other and the diameter d1 of the ultrasonic transducers are the same.

Also, the plurality of ultrasonic transducers may employ at least one of various methods for generating ultrasonic signals. For example, the ultrasonic transducer may be implemented as a magnetostrictive ultrasonic transducer (MUT) using the magnetostrictive effect of a magnetic material, a piezoelectric ultrasonic transducer (PUT) using the piezoelectric effect of a piezoelectric material, or a piezoelectric micromachined ultrasonic transducer (pMUT), or may be implemented as a capacitive micromachined ultrasonic transducer (cMUT) generating ultrasonic waves using vibrations of hundreds or thousands of micromachined thin films. Ultrasonic waves may need to be generated, and there may be no limitation in the method of generating ultrasonic waves.

FIG. 3 illustrates the sound pressure formed at the target location TP by the ultrasonic actuator 111 described above.

As illustrated in FIG. 3, the ultrasonic signals generated by each of the plurality of ultrasonic transducers UT of the ultrasonic actuator 111 may be gradually attenuated while passing through a medium (air), may overlap, and may form a sound pressure of a predetermined magnitude at a target location TP, which may be a predetermined distance 310 away from the ultrasonic actuator 111. The region 310 between the ultrasonic actuator 111 and the target location TP may correspond to a sound pressure overlapping region in which the sound pressure of the ultrasonic signal generated by each of the plurality of ultrasonic transducers UT overlaps. The target location TP, the dangerous region DR, and the safety region SR may all be included in the above-mentioned sound pressure overlapping region.

Here, as described above, the sound pressure of the predetermined magnitude may be 50 dB or more and 120 dB or less. Also, the predetermined distance 310 may be at least 1 m or more and 3 m or less from the ultrasonic actuator 111. Also, FIG. 3 illustrates a safety region SR and a dangerous region DR.

Meanwhile, the object sensor 112 of the haptic stimulation providing unit 110 may sense (e.g., detect) an object within a dangerous region DR between the ultrasonic actuator 111 and the target location TP.

Here, the object may include a part of a body, and the dangerous region may be a region in which the sound pressure generated by the ultrasonic actuator 111 may be greater than a predetermined magnitude (e.g., 140 dB) in the region between the ultrasonic actuator 111 and the target location TP.

That is, as illustrated in FIG. 4A, the region between the ultrasonic actuator 111 and the target location TP may be divided into a safety region SR and a dangerous region DR, and the safety region SR may be an region in which the sound pressure formed by the ultrasonic actuator 111 may be less than a predetermined magnitude (e.g., 140 dB), and the dangerous region DR may be a region in which the sound pressure generated by the ultrasonic actuator 111 may be greater than or equal to a predetermined magnitude (e.g., 140 dB).

The object sensor 112 described above may include at least one of a laser sensor, an infrared sensor, and an ultrasonic sensor.

That is, as illustrated in FIG. 4A, if the object sensor 112 is a laser sensor, reference numeral 420 may be a laser signal. If the object sensor 112 is an infrared sensor, reference numeral 420 may be an infrared signal. If the object sensor 112 is an ultrasonic sensor, reference numeral 420 may be an ultrasonic signal. A part of the body within the dangerous region DR may be sensed (e.g., detected) based on the above-described laser signal, infrared signal, and ultrasonic signal.

Meanwhile, at least one object sensor 112 described above may be provided around the ultrasonic actuator 111 as illustrated in FIG. 2.

The control module 120 may protect a part of the body from high sound pressure by an ultrasonic signal by stopping operation (e.g., decrease or terminate power) of the ultrasonic actuator 111 if an object within a dangerous region is sensed (e.g., detected).

An operation of an apparatus for providing haptic stimulation will be described with reference to FIGS. 4A and 4B. FIG. 4A illustrates an example in which both the ultrasonic actuator and the object sensor 112 are operating, and FIG. 4B illustrates the example in which operation of the ultrasonic actuator is stopped. Reference numeral 410 may be an ultrasonic signal generated by an ultrasonic actuator, reference numeral 420 may be an object sensing signal by the object sensor 112, and reference numeral 400 may be a planar body.

That is, as illustrated in FIG. 4A, during normal operation, ultrasonic waves 410 may be generated by the ultrasonic actuator, and a haptic stimulation may be provided to the part of body OB located at the target location TP by forming sound pressure at the target location TP by the generated ultrasonic signal. In this case, the object sensor 112 may continuously sense (e.g., detect) a part of the body within the dangerous region DR through an object sensing signal 420.

However, if the object sensor 112 senses (e.g., detects) a part of the body OB in the dangerous region DR while sound pressure is formed at the target location TP by the generated ultrasonic signal 410, as illustrated in FIG. 4B, the control module may protect a part of the body from high sound pressure by the ultrasonic signal by stopping operation of the ultrasonic actuator.

Finally, the storage module 10 may store a program for executing the function of the control module 120.

Figure 5:
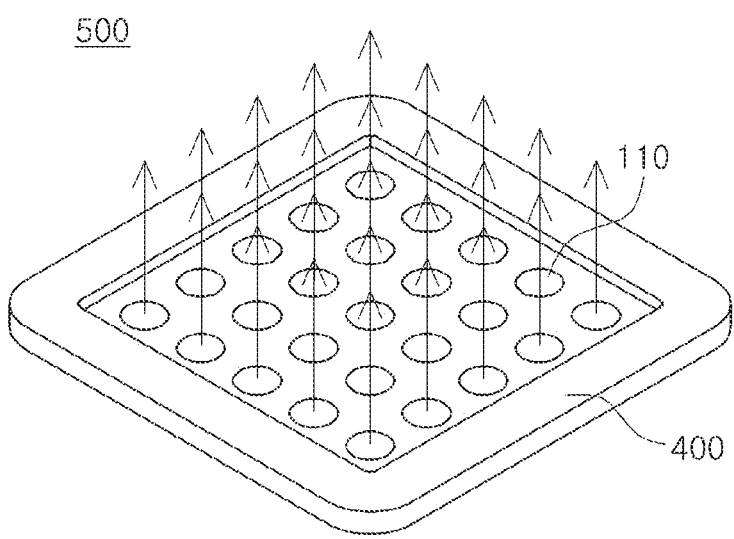
FIG. 5 is a diagram illustrating a planar haptic stimulation providing module.

FIG. 5 is a diagram illustrating a planar haptic stimulation providing module.

As illustrated in FIG. 5, in the planar haptic stimulation providing module 500, the haptic stimulation providing unit 110 described above may be disposed on one surface of a planar body 400 in a matrix form. In this case, a large target area TA including a target location of each haptic stimulation providing unit 110 may be formed.

Figure 6:
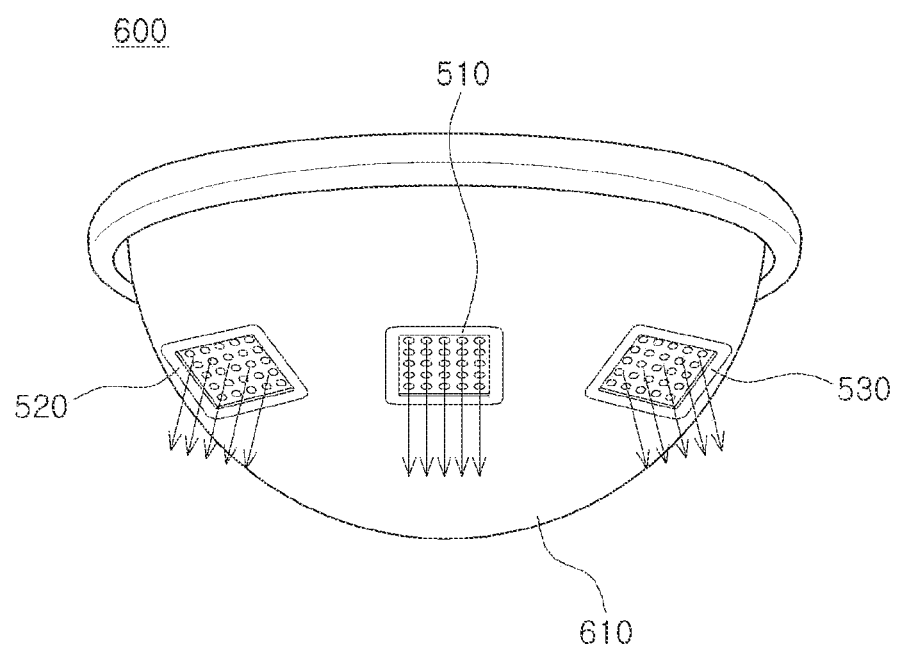
FIG. 6 is a diagram illustrating a hemispherical haptic stimulation providing module.

FIG. 6 is a diagram illustrating a hemispherical haptic stimulation providing module.

As illustrated in FIG. 6, the hemispherical haptic stimulation providing module 600 may have a form in which a plurality of planar haptic stimulation providing modules 510, 520, and 530 may be attached to the surface of the hemispherical frame 610, and the plurality of planar haptic stimulation providing modules 510, 520, and 530 may form target regions in different positions. Although FIG. 6 illustrates only three planar haptic stimulation providing modules 510, 520, and 530, but the number of the modules may be modified in example embodiments.

The above-described haptic stimulation providing unit 110, the planar haptic stimulation providing module 500, or the hemispherical haptic stimulation providing module 600 may be provided in a vehicle. For example, the modules may be provided on at least one of an upper part of a vehicle, a center fascia, an A-pillar, and a windshield. The specific positions of the modules are not limited thereto, and the modules may be provided in various positions in example embodiments.

As described above, if a part of the body is sensed (e.g., detected) in the dangerous region while the ultrasonic actuator forming sound pressure at the target location is operating, by stopping operation of the ultrasonic actuator, the part of the body may be protected from high sound pressure by the ultrasonic signal.

By installing the above-described apparatus for providing haptic stimulation in a vehicle, haptic stimulation may be provided to overall passengers even at a long distance.

Figure 7:
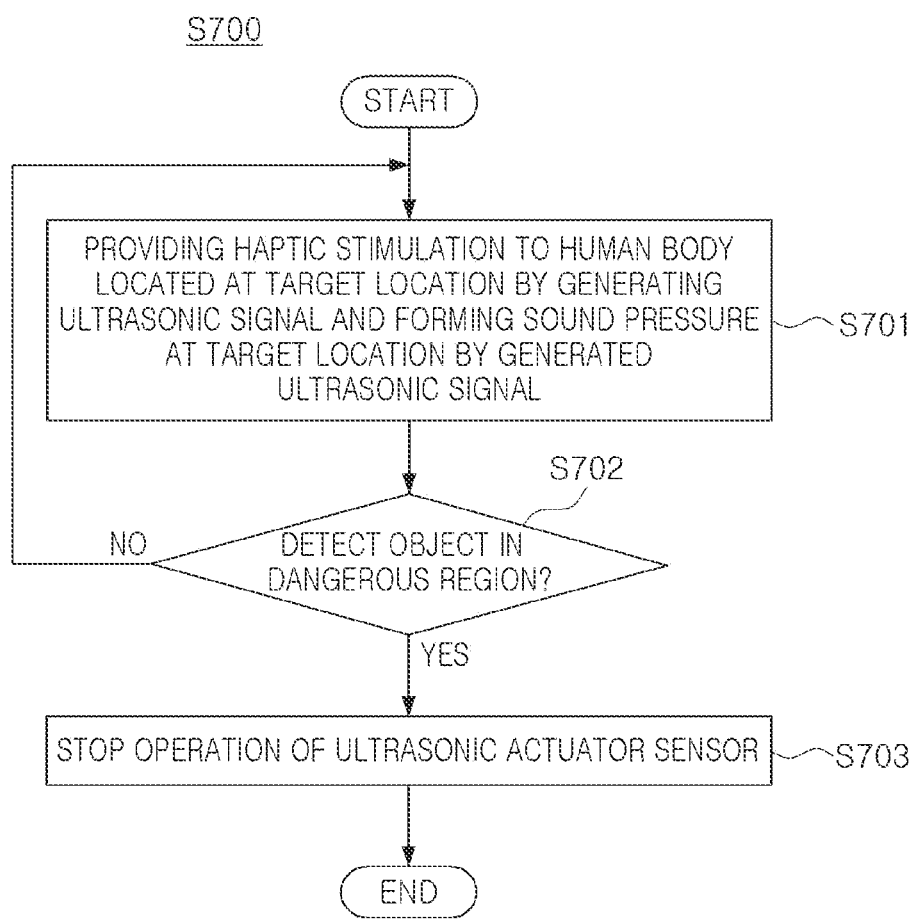
FIG. 7 is a flowchart illustrating a method of providing haptic stimulation.

FIG. 7 is a flowchart illustrating a method of providing haptic stimulation.

Hereinafter, a method of providing haptic stimulation (S700) will be described with reference to FIGS. 1 to 7.

Referring to FIGS. 1 to 7, the method of providing haptic stimulation (S700) may start with an operation of providing a haptic stimulation to a part of a body located at a target location by generating an ultrasonic signal by an ultrasonic actuator 111 and forming sound pressure at a target location by the generated ultrasonic signal (S701).

It may be assumed that the sound pressure formed at the target location may be approximately 50 dB or more and 120 dB or less, and the region in which the magnitude of the sound pressure generated by the ultrasonic actuator 111 in the region from the ultrasonic actuator 111 to the target location is a predetermined magnitude, for example, 140 dB or more, may be defined as a dangerous region DR. Also, in the region from the ultrasonic actuator 111 to the target location, the region in which the magnitude of the sound pressure generated by the ultrasonic actuator 111 is less than 140 dB may be defined as a safety region SR.

Also, the above-described ultrasonic actuator 111 may include a plurality of ultrasonic transducers UT, and the plurality of ultrasonic transducers UT may be disposed such that a distance between ultrasonic transducers adjacent to each other and a diameter of the ultrasonic transducer may be the same.

Thereafter, the object sensor 112 may sense (e.g., detect) an object within the dangerous region DR between the ultrasonic actuator 111 and the target location TP (S702). Here, as described above, the object may include a part of a body.

Meanwhile, operation 702 may be performed after operation S701 in FIG. 7, but operation S701 may be performed after operation 702.

As described above, the above-described object sensor 112 may include at least one of a laser sensor, an infrared sensor, and an ultrasonic sensor.

Also, at least one object sensor 112 described above may be provided around the ultrasonic actuator 111 as illustrated in FIG. 2.

Finally, the control module 120 may protect a part of the body from high sound pressure by the ultrasonic signal by stopping the operation of the ultrasonic actuator 1110 if an object within the dangerous region is sensed (S703) (e.g., detected).

As described above, if a part of the body is sensed (e.g., detected) in the dangerous region while the ultrasonic actuator for forming sound pressure at the target location is operating, by stopping operation of the ultrasonic actuator, the part of the body may be protected from high sound pressure by the ultrasonic signal.

By installing the above-described apparatus for providing haptic stimulation in a vehicle, haptic stimulation may be provided to overall passengers even at a long distance.

Figure 8:
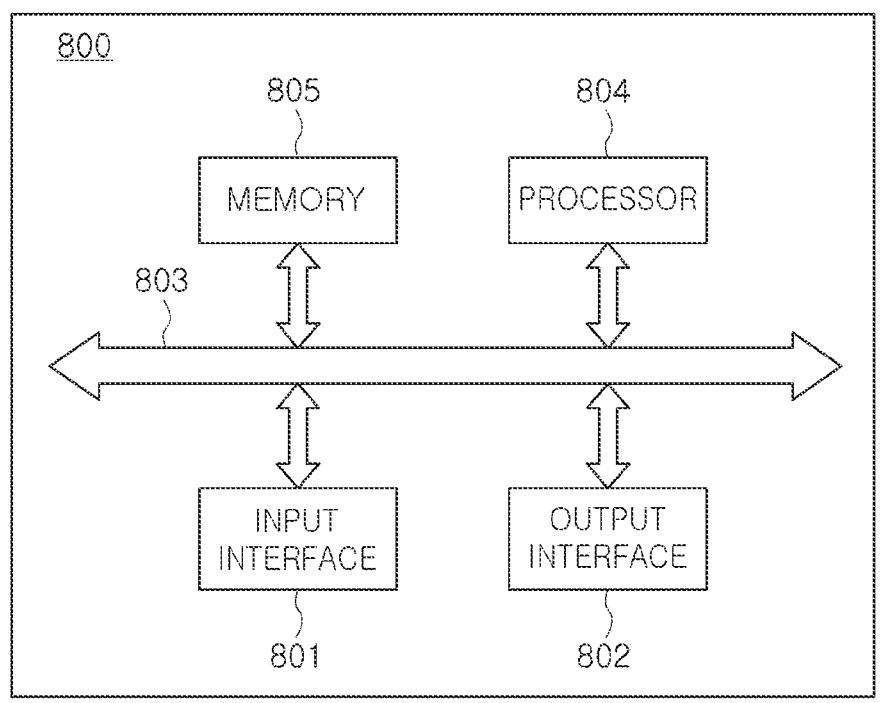
FIG. 8 is a block diagram illustrating a computer device for entirely or partially implementing an apparatus for providing haptic stimulation.

FIG. 8 is a block diagram illustrating a computer device for entirely or partially implementing an apparatus for providing haptic stimulation, applied to the apparatus for providing haptic stimulation 100 illustrated in FIG. 1.

As illustrated in FIG. 8, the computer device 800 may include an input interface 801, an output interface 802, a processor 804 and a memory 805, the input interface 801, the output interface 802, the processor 804 and memory 805 may be interconnected through a system bus 803.

The memory 805 may be used to store programs, instructions or codes, and the processor 804 may execute the programs, instructions or codes stored in the memory 805, may receive a signal by controlling the input interface 801, and may transmit a signal by controlling the output interface 802. The aforementioned memory 805 may include a read-only memory and a random access memory, and may provide instructions and data to the processor 804.

The processor 804 may be a central processing unit (CPU), another general-purpose processor, a digital signal processor (DSP), an application specific integrated circuit (ASIC), field programmable gate array (FPGA) or other programmable logic device, discrete gate or transistor logic device, discrete hardware component, or the like. A general purpose processor may be a microprocessor, or the processor may be a generally used processor.

In an implementation process, the method performed in each device in FIG. 1 may be performed by an integrated logic circuit of hardware in the processor 804 or an instruction in the form of software. The descriptions of the disclosed example methods may be implemented to be performed and completed by a hardware processor or to be performed and completed by a combination of hardware and software modules of a processor. The software module may be stored in memory, such as random access memory, flash memory, read only memory, programmable read only memory or electrically erasable programmable memory, and register, and the processor 804 may read the information in the memory 805, and may implement the method described above.

If the ultrasonic actuator for forming sound pressure at the target location operates and a body part is sensed (e.g., detected) within the dangerous region, by stopping the ultrasonic actuator, the part of the body may be protected from high sound pressure caused by the ultrasonic signal.

By installing the above-described apparatus for providing haptic stimulation in a vehicle, haptic stimulation may be provided to overall passengers even at a long distance.

While the example embodiments have been illustrated and described above, it will be apparent to those skilled in the art that modifications and variations could be made without departing from the scope of the present disclosure as defined by the appended claims.

What is claimed is:
1. An apparatus comprising:
an ultrasonic actuator configured to provide haptic stimulation to a part of a body located at a target location by:
generating an ultrasonic signal; and
forming sound pressure at the target location via the generated ultrasonic signal;
an object sensor provided around the ultrasonic actuator and configured to detect an object within a region between the ultrasonic actuator and the target location; and a control module configured to stop operation of the ultrasonic actuator based on detecting the object within the region.

2. The apparatus of claim 1,
wherein the ultrasonic actuator comprises a plurality of ultrasonic transducers, and
wherein, within the region between the ultrasonic actuator and the target location, a magnitude of sound pressure overlapping by each of the plurality of ultrasonic transducers is greater than or equal to a predetermined magnitude.

3. The apparatus of claim 1, wherein the object sensor comprises a plurality of object sensors provided around the ultrasonic actuator.

4. The apparatus of claim 1, wherein the object sensor comprises at least one of: a laser sensor, an infrared sensor, or an ultrasonic sensor.

5. The apparatus of claim 2, wherein the plurality of ultrasonic transducers are disposed such that a distance between any two adjacent ultrasonic transducers of the plurality of ultrasonic transducers is equal to a diameter of an ultrasonic transducer of the plurality of ultrasonic transducers.

6. The apparatus of claim 1,
wherein the ultrasonic actuator and the object sensor are included in a haptic stimulation providing unit, and
wherein at least two or more haptic stimulation providing units are disposed in a matrix form on a planar body of a planar haptic stimulation providing module.

7. The apparatus of claim 6, wherein the haptic stimulation providing unit or the planar haptic stimulation providing module is provided on at least one of: an upper part of an interior of a vehicle, a center fascia, an A-pillar, or a windshield.

8. The apparatus of claim 2, wherein the predetermined magnitude is 140 dB.

9. The apparatus of claim 1, wherein the object comprises the part of the body.

10. A method comprising:
providing, via an ultrasonic actuator, a haptic stimulation to a part of a body located at a target location by:
generating an ultrasonic signal; and
forming sound pressure at the target location via the generated ultrasonic signal;
detecting, via an object sensor provided around the ultrasonic actuator, an object within a region between the ultrasonic actuator and the target location; and
stopping operation of the ultrasonic actuator based on detecting the object within the region.

11. The method of claim 10,
wherein the ultrasonic actuator comprises a plurality of ultrasonic transducers, and
wherein, within the region between the ultrasonic actuator and the target location, a magnitude of sound pressure overlapping by each of the plurality of ultrasonic transducers is greater than or equal to a predetermined magnitude.

12. The method of claim 10, wherein the object sensor comprises a plurality of object sensors provided around the ultrasonic actuator.

13. The method of claim 11, wherein the object sensor comprises at least one of: a laser sensor, an infrared sensor, or an ultrasonic sensor.

14. The method of claim 11, wherein the plurality of ultrasonic transducers are disposed such that a distance between any two adjacent ultrasonic transducers of the plurality of ultrasonic transducers is equal to a diameter of an ultrasonic transducer of the plurality of ultrasonic transducers.

15. The method of claim 10,
wherein the ultrasonic actuator and the object sensor are included in a haptic stimulation providing unit, and
wherein at least two or more haptic stimulation providing units are disposed in a matrix form on a planar body of a planar haptic stimulation providing module.

16. The method of claim 15, wherein the haptic stimulation providing unit or the planar haptic stimulation providing module is provided on at least one of an upper part of: an interior of a vehicle, a center fascia, an A-pillar, or a windshield.

17. The method of claim 11, wherein the predetermined magnitude is 140 dB.

18. The method of claim 10, wherein the object comprises the part of the body.

* * * * *